(12) United States Patent
Uchihara (10) Patent No.: US 7,956,891 B2
(45) Date of Patent: Jun. 7, 2011

(54) CAMERA CONTROL APPARATUS AND METHOD, AND CAMERA CONTROL SYSTEM

(75) Inventor: Masato Uchihara, Tokyo (JP)

(73) Assignee: Canon Kabushiki Kaisha (JP)

( * ) Notice: Subject to any disclaimer, the term of this patent is extended or adjusted under 35 U.S.C. 154(b) by 469 days.

(21) Appl. No.: 11/970,244

(22) Filed: Jan. 7, 2008

(65) Prior Publication Data
US 2008/0211929 A1    Sep. 4, 2008

(30) Foreign Application Priority Data

Jan. 10, 2007    (JP) .................................. 2007-002625

(51) Int. Cl.
*H04N 7/18*    (2006.01)
(52) U.S. Cl. .......................... 348/143; 348/153; 348/159
(58) Field of Classification Search .................. None
See application file for complete search history.

(56) References Cited

U.S. PATENT DOCUMENTS

| 6,768,563 | B1 * | 7/2004 | Murata et al. ................. 358/450 |
| 7,113,971 | B1 * | 9/2006 | Ohi et al. ....................... 709/203 |
| 2006/0010028 | A1 * | 1/2006 | Sorensen ........................ 705/10 |
| 2006/0197839 | A1 * | 9/2006 | Senior et al. .................. 348/169 |

FOREIGN PATENT DOCUMENTS

| JP | 8-265742 A | 10/1996 |
| JP | 10-40185 A | 2/1998 |
| JP | 10-42278 A | 2/1998 |

* cited by examiner

*Primary Examiner* — Lin Ye
*Assistant Examiner* — Euel K Cowan
(74) *Attorney, Agent, or Firm* — Rossi, Kimms & McDowell LLP (57) ABSTRACT

A camera control system having a terminal device connected to a plurality of cameras via a network is provided. In response to an operation that exceeds a maximum control value (maximum control angle) of the PTZ of a camera that is the target of control, the terminal device displays peripheral camera information, which corresponds to a shooting direction in which the operation has been requested, together with video shot by the camera being controlled. The peripheral camera information includes installation camera position information, viewable angle information, control status information and peripheral map information as well as at least one item of captured video from a camera other than the camera being controlled.

15 Claims, 9 Drawing Sheets

| CAMERA ID | PTZ OPERATION RANGE | INSTALLATION POSITION (x, y, z) | INSTALLATION METHOD (P, T) | USER |
|---|---|---|---|---|
| C-01 | (60, 40, 20) | (10, 150, 5) | (270, 0) | USER 03 |
| C-03 | (90, 30, 10) | (30, 100, 3) | (135, 0) | USABLE |
| C-09 | (180, 0, 30) | (50, 150, 5) | (270, 0) | USER 20 |
| C-13 | (70, 20, 0) | (60, 30, 8) | (0, 0) | USABLE |
| C-14 | (90, 45, 5) | (75, 100, 5) | (135, 5) | OFF |
| C-31 | (180, 60, 10) | (110, 150, 5) | (135, 0) | USER 07 |
| .... | .... | .... | .... | .... |

FIG. 9

CAMERA CONTROL APPARATUS AND METHOD, AND CAMERA CONTROL SYSTEM

BACKGROUND OF THE INVENTION

1. Field of the Invention

The present invention relates to a camera control technique.

2. Description of the Related Art

Network camera systems in which video captured by a camera is transmitted to a terminal device such as a personal computer or mobile telephone via a network such as the Internet have been widespread in recent years. A user operates a GUI (Graphical User Interface) on the terminal device and specifies the panning, tilt angle and zoom magnification of a network camera to thereby change the shooting direction of the camera (see the specification of Japanese Patent Application Laid-Open No. 10-40185).

Network camera systems are being used in surveillance systems at train stations, hospitals and kindergartens, real-time video distribution systems at tourist attractions, and multi-source video distribution systems for live sports broadcasts. A technique that has been proposed for such video distribution systems assigns the camera control privilege to users at fixed time intervals in which multiple users cannot operate the network camera simultaneously (see the specification of Japanese Patent Application Laid-Open No. 10-42278).

Further, in a case where a plurality of controllable cameras have been deployed in the same region or on the same premises, there is a proposed technique whereby a user changes over the controllable cameras utilizing map information indicating the locations at which the cameras have been installed (see the specification of Japanese Patent Application Laid-Open No. 8-265742).

However, a problem with the prior art is that if the number of controllable cameras is large, camera changeover control is difficult. For example, consider a case where a parent is observing his or her own child by using a network camera system installed at a kindergarten. In this case, when the child is about to move outside the viewing angle of the camera being operated by the parent, it is required that the parent refer to the entire shooting area inclusive of the camera placement information and select a new camera again. With this method, selecting the best camera takes time because of the large number of cameras that are capable of shooting continuously. Further, since a display screen for displaying the entire shooting area is required, control of the display is difficult with a terminal device such as a mobile telephone having a small display area.

SUMMARY OF THE INVENTION

Accordingly, an object of the present invention is to realize a camera control technique in which even if a camera being operated by a user has reached the limit of its viewing angle, changeover to another camera for allowing the user to continue shooting is facilitated and operability is enhanced.

According to one aspect of the present invention, a camera control apparatus for selecting and controlling one of a plurality of cameras connected to a network is provided. The apparatus includes a determination unit configured to determine whether or not a camera control corresponding to an operation request exceeds a viewable angle of a control-target camera, and a display control unit configured to cause camera information corresponding to the operation request to be displayed on a display device in response to the operation request in a case where the camera control corresponding to the operation request exceeds the viewable angle of the control-target camera.

Further features of the present invention will become apparent from the following description of exemplary embodiments (with reference to the attached drawings).

DESCRIPTION OF THE EMBODIMENTS

Various exemplary embodiments, features and aspects of the present invention will be described in detail below with reference to the drawings.

Figure 1:
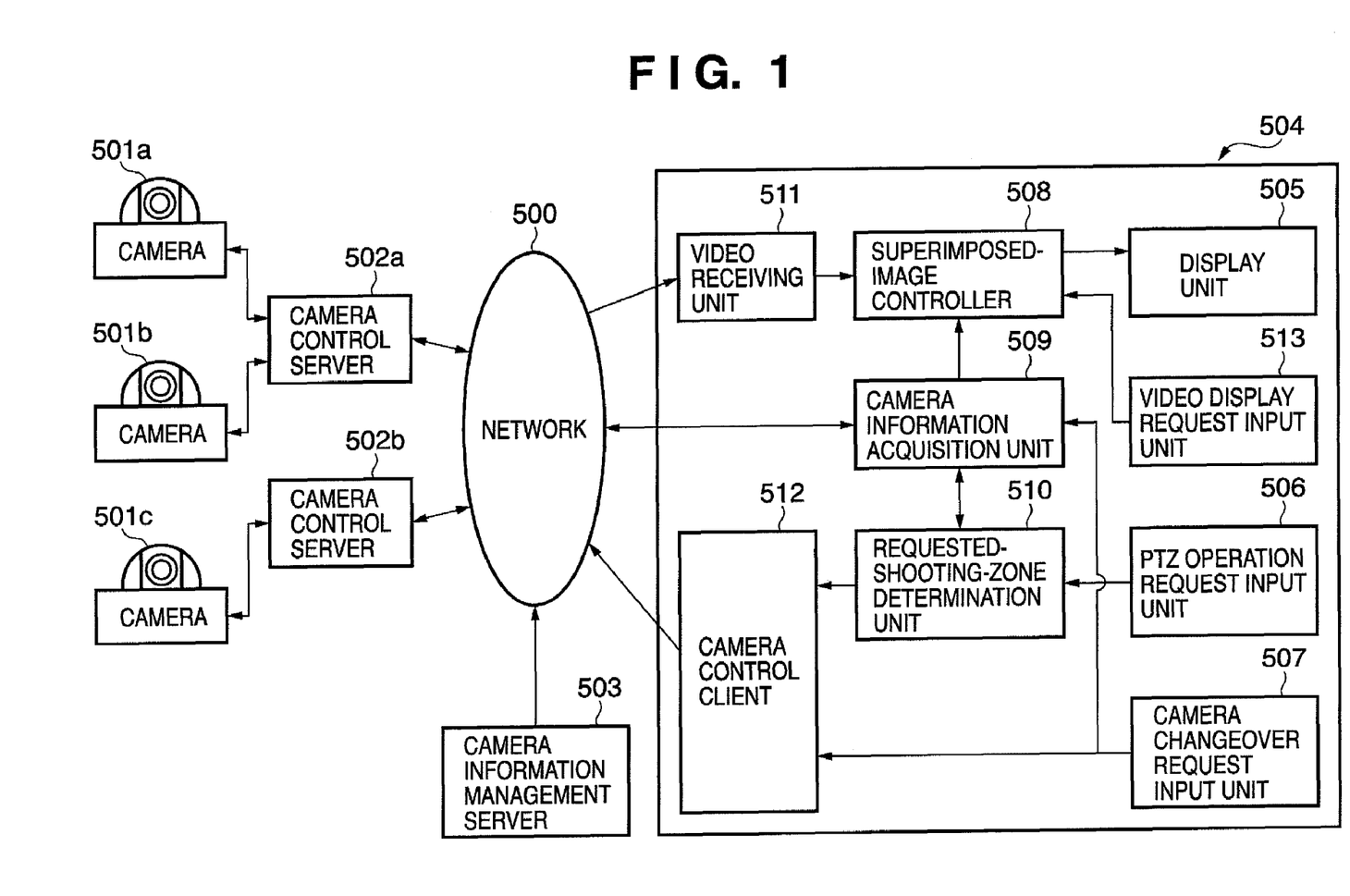
FIG. 1 is a diagram illustrating the overall configuration of a camera control system according to an embodiment of the present invention.

FIG. 1 is a diagram illustrating the overall configuration of a camera control system according to an embodiment of the present invention.

A plurality of cameras 501a, 501b, 501c are so-called network cameras and are connected to a network 500 such as the Internet via a camera control server 502a or 502b. A camera information management server 503 is connected to the network 500 and manages position information, viewable angle information and control status information relating to the cameras 501a to 501c. The position information is information indicating positions on a map at which the cameras have been installed. The viewable angle information is information relating to viewable angle delimited by the PTZ (pan angle, tilt angle and zoom magnification) operating range of each camera. The control status information is information relating to the user controlling each camera and to the camera ID. These items of information are reported to the camera information management server 503 from the camera control servers 502a, 502b when a camera is started up or when a camera control privilege is changed.

A terminal device 504 comprises a personal computer, mobile telephone or mobile information terminal, etc. The terminal device 504 has a display unit 505, a PTZ operation request input unit 506, a camera changeover request input unit 507, a superimposed-image controller 508, a camera information acquisition unit 509, a requested-shooting-zone determination unit 510, a video receiving unit 511 and a camera control client 512.

The display unit 505 is constituted by a liquid crystal panel or the like and displays video captured by a camera. The PTZ operation request input unit 506 is a control panel for allowing the user to control the PTZ of the camera. The camera changeover request input unit 507 is a control panel for allowing the user to change over the camera control privilege.

Figure 6:
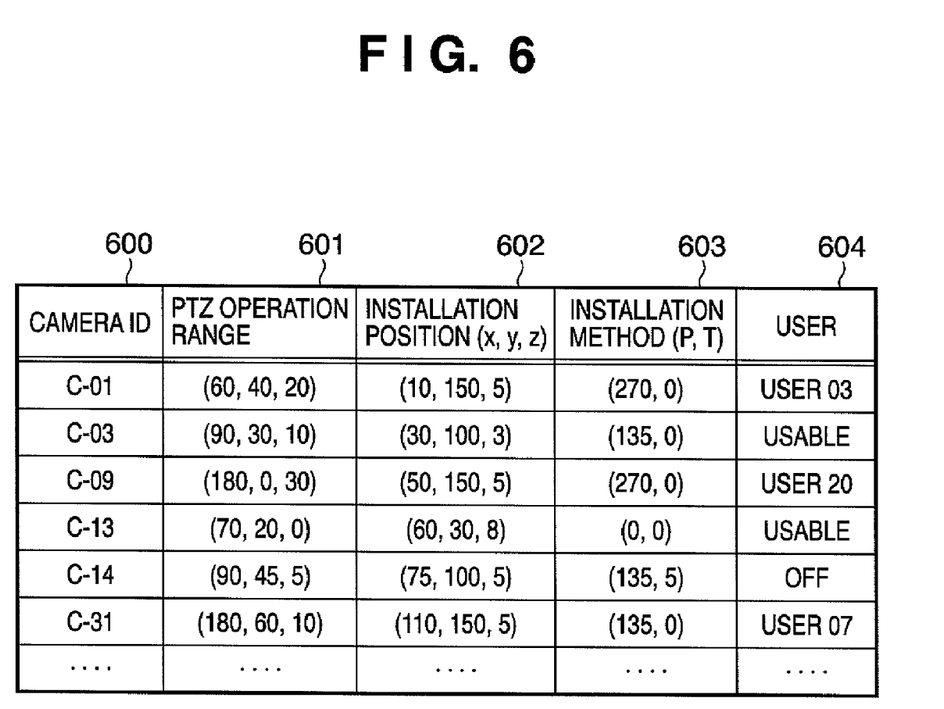
FIG. 6 is a diagram illustrating an example of a camera information table that has been stored in a camera information management server in this embodiment.

Upon receiving a camera operation request from the PTZ operation request input unit 506, the requested-shooting-zone determination unit 510 determines whether the entered PTZ operation has not exceeded the PTZ operating range (maximum control value) of the camera that is the target of control. If the entered PTZ operation is within the PTZ operation range, control conforming to the entered PTZ operation (value) is requested of the camera control client 512 by the requested-shooting-zone determination unit 510. PTZ operation range information is the maximum control value relating to the PTZ of each camera, as illustrated in FIG. 6, described later.

If it is determined that the entered PTZ operation exceeds the PTZ operation range, on the other hand, a request to display camera information is sent to the camera information acquisition unit 509 together with coordinates of a requested shooting zone.

When a camera is started up or when the camera control privilege is changed by the camera changeover request input unit 507, the camera information acquisition unit 509 accesses the camera information management server 503 and acquires PTZ operation range information relating to all cameras operating on the network 500. Further, in accordance with the reported coordinates of a requested shooting zone when a camera information display request has been received from the requested-shooting-zone determination unit 510, the camera information acquisition unit 509 creates camera information and transmits it to the superimposed-image controller 508. The camera information includes position information, viewable angle information, control status information and map information concerning the control-target camera and surrounding cameras (cameras other than the control-target camera) as well as at least one item of captured video from a camera other than the control-target camera. The coordinates of the requested shooting zone refer to the result of adding parameters corresponding to respective ones of the pan angle, tilt angle and zoom magnification of an entered operation request to a pan angle, tilt angle and zoom magnification, respectively, that have already been stored.

The superimposed-image controller 508 crops an image indicating camera information from the camera information acquisition unit 509 and video (camera-shot video) from the video receiving unit 511 so as to fit on the display screen of the display unit 505, and outputs the results to the display unit 505. Furthermore, in accordance with an input from a video display request input unit 513, video from a camera other than the control-target camera acquired by the video receiving unit 511 is output to the display unit 505. The camera other than the control-target camera is a camera selected by the user at the video display request input unit 513.

Figure 2:
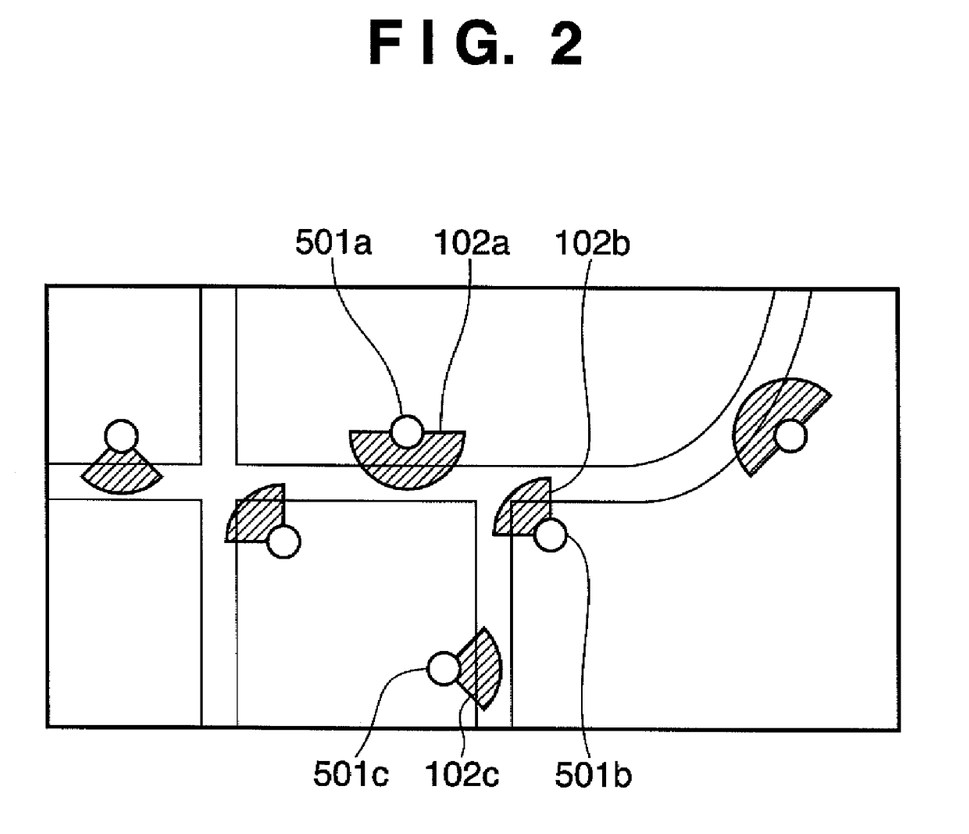
FIG. 2 is a diagram illustrating an overview of camera layout in the camera control system of FIG. 1.

This embodiment is such that with respect to an operation that has exceeded the maximum control value (maximum control angle) of the PTZ of the control-target camera, camera information corresponding to the shooting direction for which operation has been requested is displayed on the terminal device 504 together with the video shot by the control-target camera. As a result, when a changeover is made to another camera, the user can select a suitable camera from among a plurality of cameras connected to the network. In this embodiment, a camera control system utilized in a situation in which a plurality of network cameras have been installed along a route as shown in FIG. 2 will be described. Sector-shaped portions 102a, 102b, 102c accompanying cameras 501a, 501b, 501c, respectively, in FIG. 3 indicate the viewable angles (viewable angle information) of the cameras.

Figure 3:
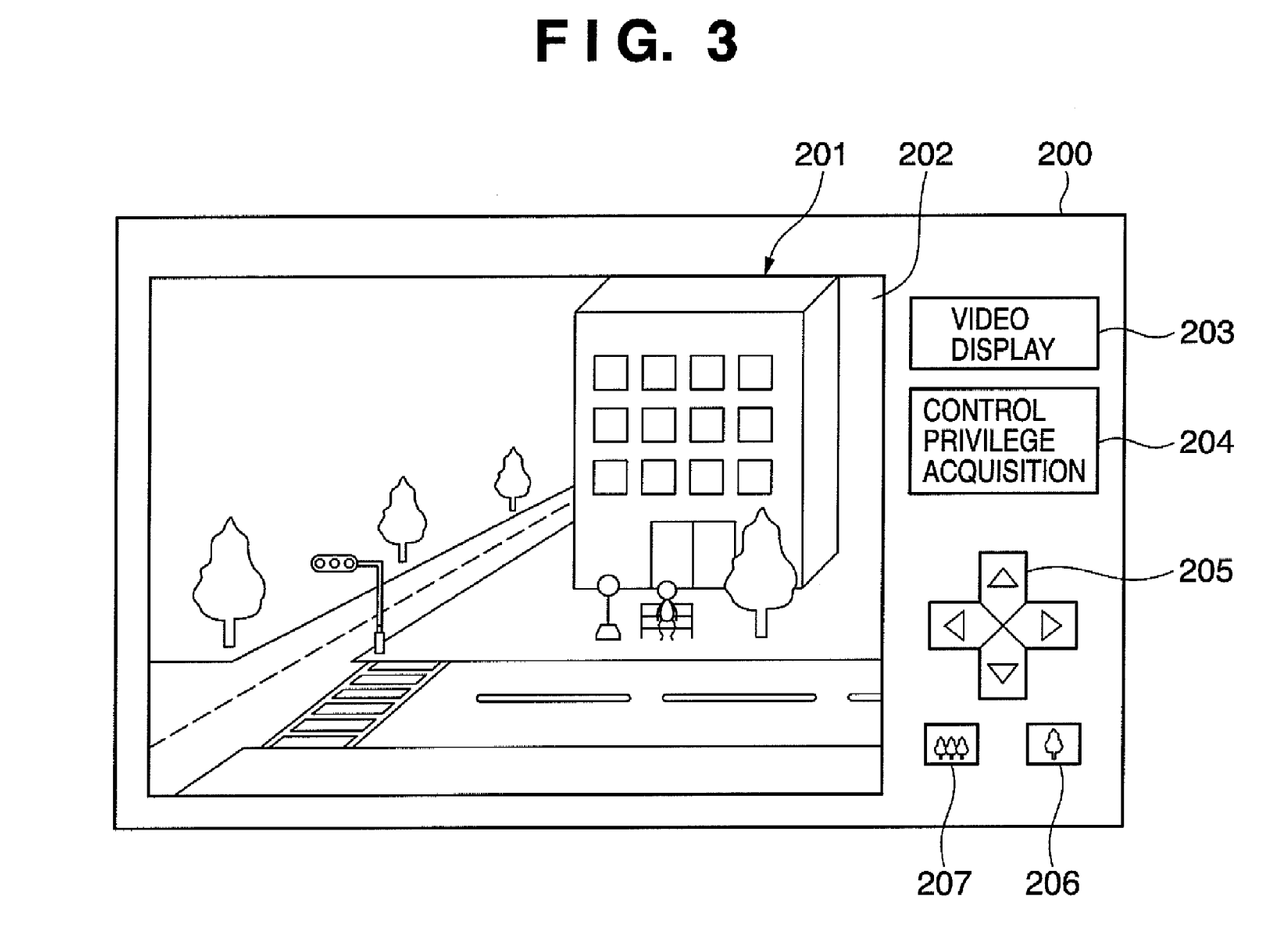
FIG. 3 is a diagram illustrating the external appearance of a control panel on a terminal device in FIG. 1.

FIG. 3 is a diagram illustrating the external appearance of a control panel on a terminal device in FIG. 1.

The terminal device 504 has a control panel 200. The control panel 200 is provided with a display screen 201, video 202 from control-target camera 501a, a video display changeover button 203 for changing over between video display/non-display and a camera control privilege changeover button 204 for changing over the camera control privilege. The control panel 200 is further provided with buttons 205 for controlling pan and tilt angles and a zoom magnification control buttons 206, 207. In a case where the terminal device is a personal computer, all of these parts would be displayed as a GUI on the display unit 505.

In a case where the terminal device 504 is a mobile information terminal such as a mobile telephone, on the other hand, only the display screen 201 is displayed on the display unit 505. Further, the video display changeover button 203, camera control privilege changeover button 204, buttons 205 for controlling pan and tilt angles and zoom magnification control buttons 206, 207 would be replaced by function selection buttons or setting buttons belonging to the mobile information terminal.

Assume that the display screen 201 is displaying video for a case where the pan angle of the camera 501a has been set to the maximum control angle in the right-hand direction. In a case where camera control in excess of the maximum control angle has been performed in conventional camera control (this corresponds to clicking of the right-hand button among the buttons 205 for controlling pan and tilt angles), this camera operation is treated as being invalid. The video displayed on the display screen 201 continues to be the video 202 prevailing at the maximum control angle of panning of camera 501a.

Figure 4:
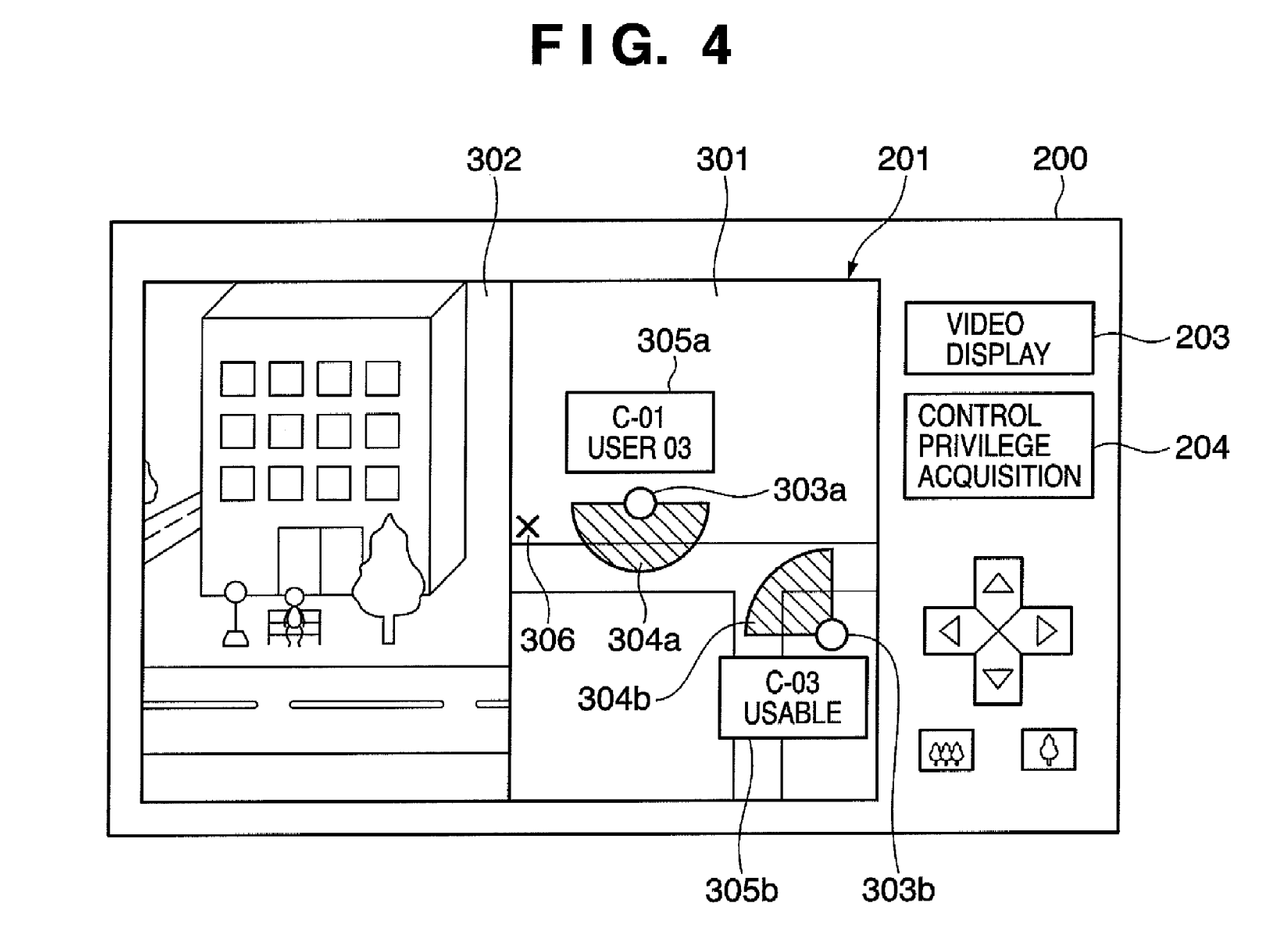
FIG. 4 is a diagram illustrating an example of a user interface displayed when presenting a camera video display on the terminal device.
Figure 5:
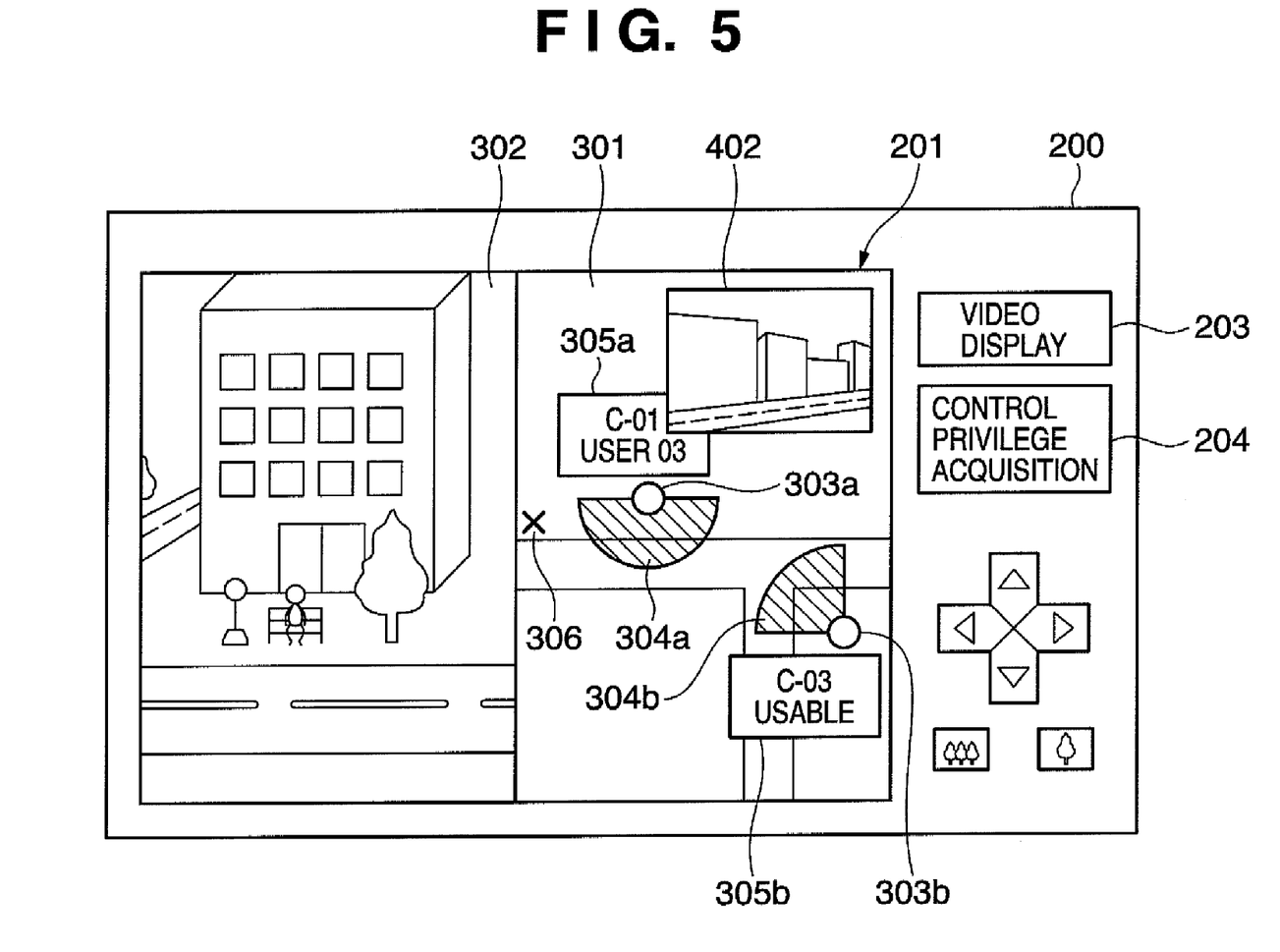
FIG. 5 is a diagram illustrating an example of a user interface for displaying camera video and camera information on the terminal device.

FIG. 4 is a diagram illustrating an example of a user interface displayed when presenting a camera video display on the terminal device 504. FIG. 5 is a diagram illustrating an example of a user interface for displaying camera video and camera information on the terminal device 504.

In a case where the terminal device 504 has been operated to perform a PTZ operation that exceeds the maximum control angle of the control-target camera 501a, an image 301 is displayed on the display screen 201 as camera information corresponding to the requested shooting direction. Meanwhile, video being shot by the control-target camera 501a is cropped in the vicinity of the maximum control angle. Video 302 that is the result is displayed on the display screen 201. The IDs of controllable cameras corresponding to the requested shooting angle may be displayed in list form as camera information.

A map of the vicinity of the position at which the control-target camera has been installed is displayed as map information on image 301 of camera information, camera installation position display icons 303a, 303b are displayed as camera position information on the image 301, and viewable angles 304a, 304b indicating camera viewable angle information are displayed on the image 301. Also displayed on the image 301 of the camera information are windows 305a, 305b that indicate the control states of the cameras, and a focal point 306 of the present control-target camera 501a.

Camera IDs (e.g., C-01, C-03), described later, and user information (user ID or user name, etc., of a user 03) of the camera to be controlled are displayed in the windows 305a, 305b. If there is no user controlling the camera, "USABLE" is displayed.

In a case where the user (user 03) was operating the terminal device 504 and controlling the camera ID: C01, the user selects the camera installation position display icon 303b being display on the image 301 of the camera information. By then pressing the video display changeover button 203, the user can display video 402 currently being shot by the camera of the specified camera ID: C-03. If the camera corresponding to the selected icon is "USABLE", then the user selects the camera installation position display icon 303b and presses the camera control privilege changeover button 204, thereby changing over the camera control privilege to the specified camera (camera ID: C-03). "USABLE" means that the camera is not being controlled by any user.

FIG. 6 illustrates a camera information table that has been stored in the camera information management server 503 of FIG. 1.

The camera information acquisition unit 509 accesses the camera information management server 503 when a camera is started up or when camera control privilege is changed by the camera changeover request input unit 507, as mentioned above. PTZ operating range information concerning all cameras operating on the network 500 is acquired from the camera information table and is stored.

Camera IDs assigned to cameras connected to the camera control servers 502a, 502b and referred to by the terminal device 504 when camera control privilege is changed over are stored in camera ID 600. PTZ operating range information indicating the zones of control of the pan angle (P), tilt angle (T) and zoom magnification (Z) are stored in PTZ operation range 601. This information is referred to as the internal angle of the sector-shaped portion of each camera in the camera information displayed on the terminal device 504.

Position information indicating installation positions of cameras on the map are stored in installation position 602. This information is referred to as camera installation positions of the camera information. Installation direction information indicating the shooting direction at the time of initial setting of the camera is stored in installation direction 603. This information is referred to as the display direction of the sector-shaped portion of each camera in the camera information.

User information indicating the status of utilization of each camera has been stored for each user and is referred to as control information concerning camera information. "USABLE" indicates that the camera is in a state in which it is not being used by any user. "OFF" indicates that the camera is in a state in which its power supply is OFF. "USER 03" and "USER 07", etc., indicate that the cameras are in a state in which they are being utilized by the respective users.

Figure 7:
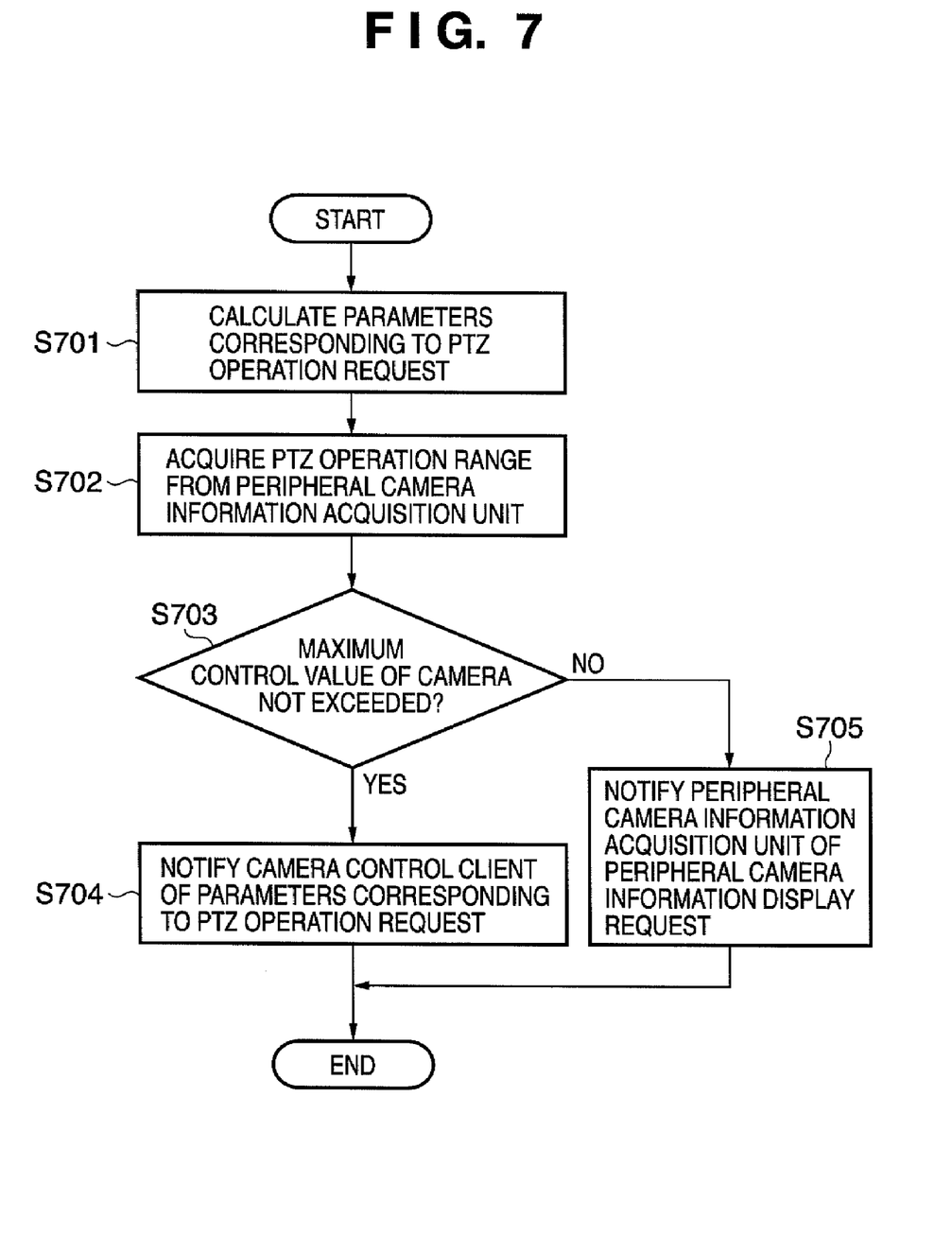
FIG. 7 is a flowchart illustrating processing for determining a requested shooting zone executed by a requested-shooting-zone determination unit in this embodiment.

FIG. 7 is a flowchart illustrating processing for determining a requested shooting zone executed by the requested-shooting-zone determination unit 510 in FIG. 1.

The requested-shooting-zone determination unit 510 accepts an input of an operation request from the PTZ operation request input unit 506. The requested-shooting-zone determination unit 510 adds parameters, which correspond to respective ones of pan angle (P), tilt angle (T) and zoom magnification (Z) of the entered operation request, to PTZ parameters that have already been stored (step S701).

Next, at step S702, the requested-shooting-zone determination unit 510 acquires PTZ operation range information concerning the control-target camera from the camera information acquisition unit 509. The requested-shooting-zone determination unit 510 then determines whether each of the parameters of pan angle, tilt angle and zoom magnification calculated at step S701 does not exceed the maximum control value of the acquired PTZ operation range information (step S703). If the maximum control value has not been exceeded ("YES" at step S703), then the requested-shooting-zone determination unit 510 reports each of the parameters of pan angle, tilt angle and zoom magnification of the entered operation request to the camera control client 512 (step S704).

On the other hand, if the result of the determination at step S703 is that the maximum control value has been exceeded ("NO" at step S703), then the requested-shooting-zone determination unit 510 reports the parameters calculated at step S701 to the camera information acquisition unit 509 together with a camera information display request (step S705) and terminates processing.

Figure 8:
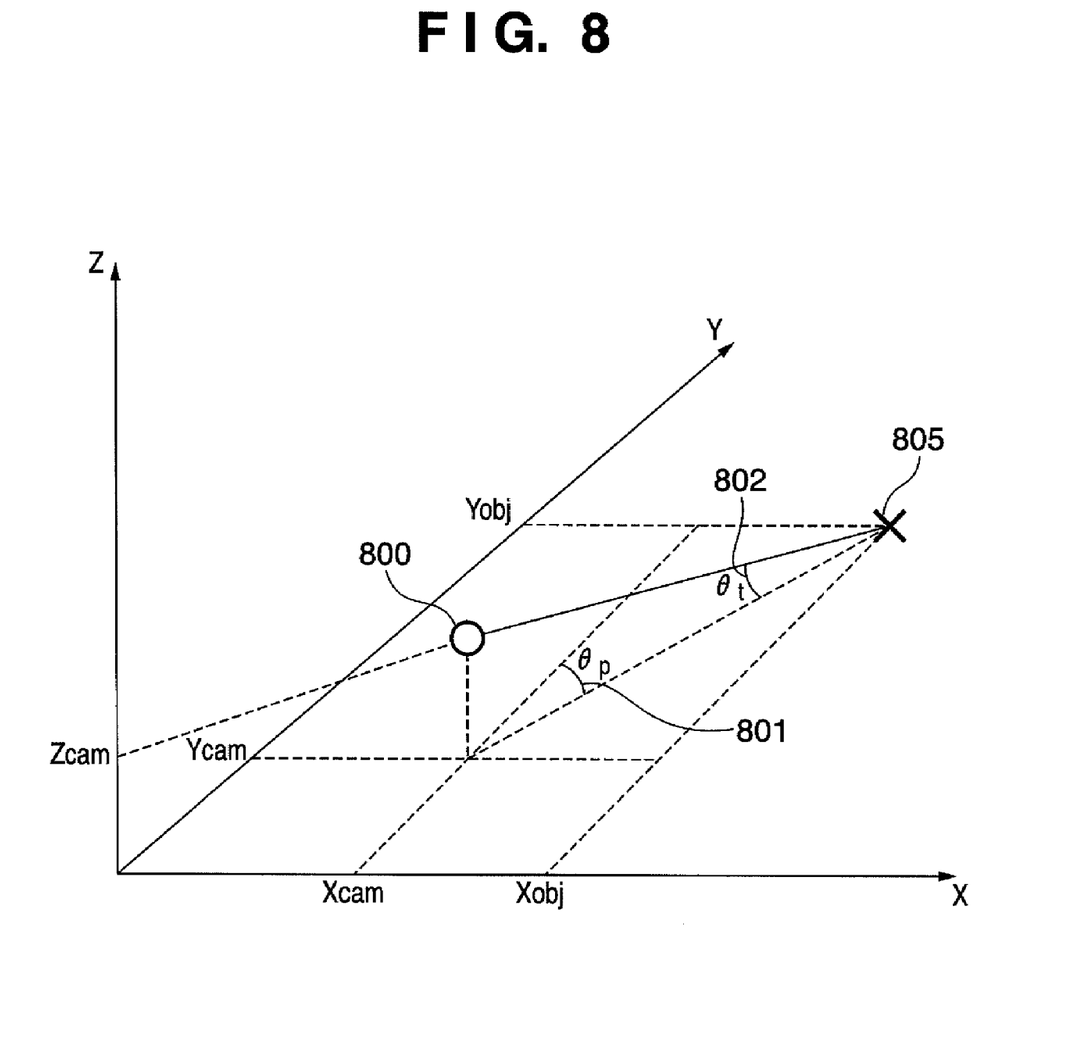
FIG. 8 is a diagram illustrating an overview of a method of calculating a target area of camera information, the method being executed by a camera information acquisition unit in this embodiment.

FIG. 8 is a diagram illustrating an overview of a method of calculating a target area of camera information, the method being executed by the camera information acquisition unit 509.

The camera information acquisition unit 509 receives notification of the camera information display request from the requested-shooting-zone determination unit 510 at step S706 in FIG. 7 and calculates a target area of camera information based upon the entered parameters. The target area of camera information is a target area in an XY plane on a map for displaying camera information as an image.

A camera position 800 represents camera position coordinates (Xcam, Ycam, Zcam) obtained from camera position information, and a focal-point area 805 represents a camera focal-point position (Xobj, Yobj) in an XY plane. Camera shooting direction angles 801 ($\theta p$) and 802 ($\theta t$) with respect to X, Y coordinates on the map can be calculated from the PTZ parameters, which have been reported from the requested-shooting-zone determination unit 510, an installation direction information indicating the shooting direction of the camera. The focal point area (Xobj, Yobj) is calculated using the following equations based upon these values:

$$Xobj = Xcam + (Zcam * \tan \theta t) * \sin \theta p \quad \text{(Eq. 1)}$$

$$Yobj = Ycam + (Zcam * \tan \theta t) * \cos \theta p \quad \text{(Eq. 2)}$$

The camera information acquisition unit 509 sets the target area of the camera information in accordance with the value of the parameter of zoom magnification centered on Xobj, Yobj calculated according to Equations (1) and (2) above. The camera information acquisition unit 509 subsequently extracts the camera that resides in the target area from the camera position information on the map of the target area, places the position information, viewable angle information and control status information on the map and then outputs these to the superimposed-image controller 508 as camera information.

Figure 9:
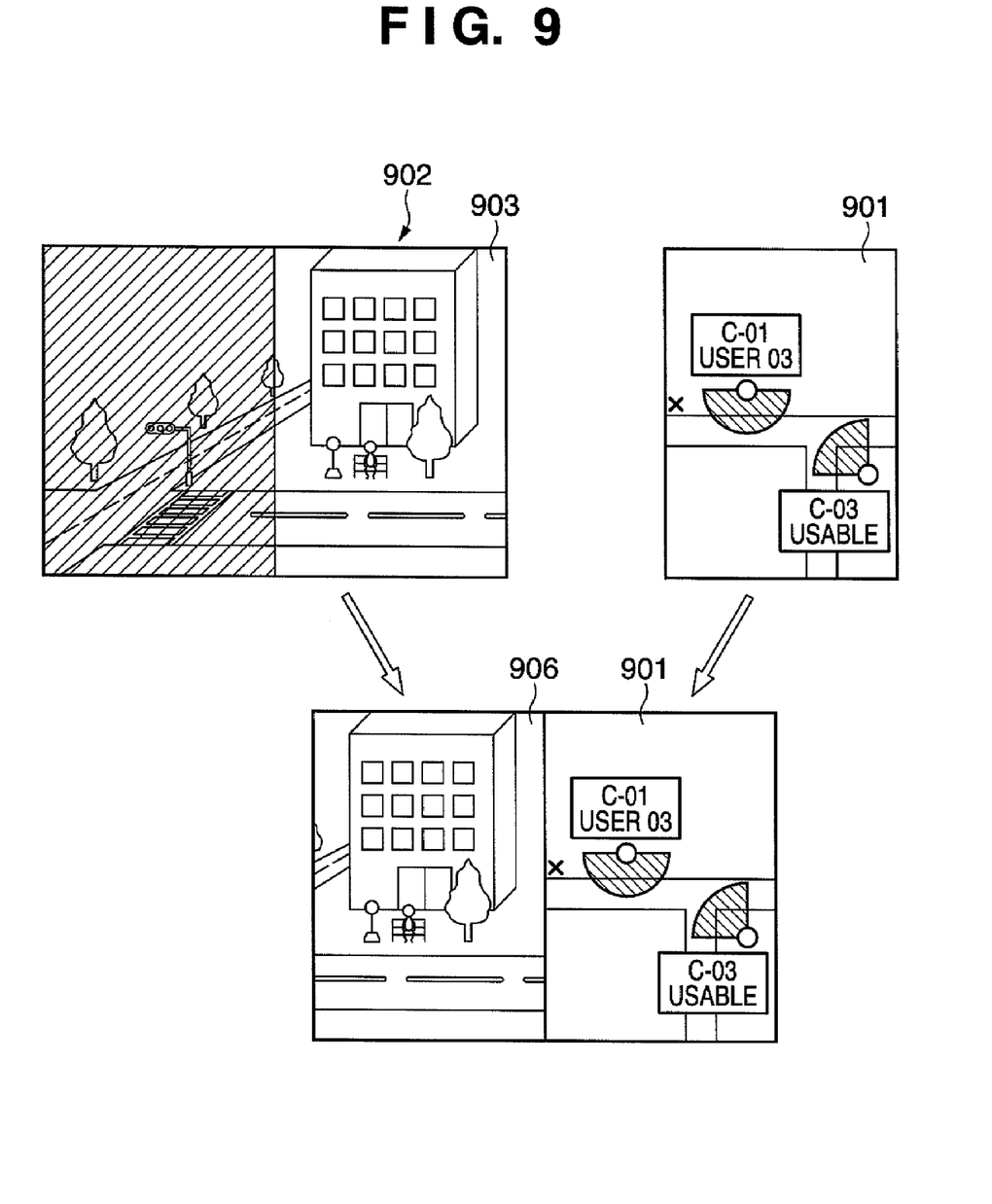
FIG. 9 is a diagram illustrating an overview of functions of a superimposed-image controller in this embodiment.

FIG. 9 is a diagram illustrating an overview of functions of the superimposed-image controller 508 in this embodiment.

An image 901 indicating camera information is camera information that has been accepted from the camera information acquisition unit 509. Video 902 is captured video that has been sent from the control-target camera. If this image and video are simply superimposed, video 903 in the vicinity of the maximum viewing angle (maximum control angle) of the camera will be concealed by the camera information image 901. In order to avoid this, the superimposed-image controller 508 holds the video 903 temporarily in an internal frame memory and creates video 906 that is the result of cutting out a blank portion obtained by subtracting the area of the camera information image 901 from the display screen 201 of the terminal device 504. As a result of this operation, it is possible for the user to check the camera information corresponding to the requested shooting direction while observing the video of the maximum viewing angle of the camera.

In accordance with this embodiment, in response to an operation request that exceeds the viewable angle of a control-target camera, camera information corresponding to the shooting direction in which operation has been requested is displayed. As a result, even if the control-target camera has reached the limit of the viewable angle owing to operation of the terminal device 504 by the user, the user can readily change over to another camera for the purpose of continuing shooting. This makes it possible to enhance the operability of the terminal device 504. Further, since video from the control-target camera and camera information are displayed on the same display screen, it is possible to readily change over cameras even from a terminal device such as a mobile telephone having a small display area.

In the embodiment described above, the invention is described in FIG. 1 in a form in which a plurality of camera control servers have been deployed. However, this does not impose a limitation upon the present invention. Further, although the camera control servers and camera information management server 503 are separate units, these may be integrated into a single unit.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-002625, filed Jan. 10, 2007, which is hereby incorporated by reference herein in its entirety.

What is claimed is:

1. A camera control apparatus connected to a plurality of cameras via a network, comprising:
   an acquisition unit configured to acquire position information of the plurality of cameras;
   a determination unit configured to determine whether or not an operation request is a request for controlling a control-target camera to operate exceeding a viewable angle of the control-target camera; and
   a display control unit configured to cause camera information of one or more cameras other than the control-target camera, having position information corresponding to the operation request to be displayed on a display device in response to the operation request in a case where the determination unit determines that the operation request is a request for controlling the control-target camera to operate exceeding the viewable angle of the control-target camera.

2. The apparatus according to claim 1, wherein said display control unit causes video from the control-target camera and the camera information to be displayed on the same screen.

3. The apparatus according to claim 1, wherein said display control unit causes position information, viewable angle information, control status information and map information concerning the control-target camera as well as at least one item of captured video from the one or more cameras having the position information corresponding to the operation request to be displayed as the camera information.

4. The apparatus according to claim 1, wherein said display control unit accepts selection of a camera, which is to be controlled, from the camera information displayed in accordance with the exceeding of the viewable angle of the control-target camera.

5. A method of controlling a camera control apparatus connected to a plurality of cameras via a network, comprising:
- an acquisition step of acquiring position information of the plurality of cameras;
- a determination step of determining whether or not an operation request is a request for controlling a control-target camera to operate exceeding a viewable angle of the control-target camera; and
- a display control step of causing camera information of one or more cameras other than the control-target camera, having position information corresponding to the operation request to be displayed on a display device in response to the operation request in a case where the determination step determines that the operation request is a request for controlling the control-target camera to operate exceeding the viewable angle of the control-target camera.

6. The method according to claim 5, wherein said display control step causes video from the control-target camera and the camera information to be displayed on the same screen.

7. The method according to claim 5, wherein said display control step causes position information, viewable angle information, control status information and map information concerning the control-target camera as well as at least one item of captured video from the one or more cameras having the position information corresponding to the operation request to be displayed as the camera information.

8. The method according to claim 5, wherein said display control step accepts selection of a camera, which is to be controlled, from the camera information displayed in accordance with the exceeding of the viewable angle of the control-target camera.

9. A non-transitory computer-readable storage medium storing a program that when executed by a computer causes the computer to perform a method of controlling a camera control apparatus connected to a plurality of cameras via a network, said program comprising:
- a code for acquiring position information of the plurality of cameras;
- a code for determining whether or not an operation request is a request for controlling a control-target camera to operate exceeding a viewable angle of the control-target camera; and
- a code for performing a display control step of causing camera information of one or more cameras other than the control-target camera, having position information corresponding to the operation request to be displayed on a display device in response to the operation request in a case where the determination step determines that the operation request is a request for controlling the control-target camera to operate exceeding the viewable angle of the control-target camera.

10. The apparatus according to claim 1, wherein said display control unit causes map information indicating a position of the control-target camera and a position of the one or more cameras positioned at a direction corresponding to the operation request exceeding the viewable angle of the control-target camera to be displayed as the camera information.

11. The method according to claim 5, wherein said display control step causes map information indicating a position of the control-target camera and a position of the one or more cameras positioned at a direction corresponding to the operation request exceeding the viewable angle of the control-target camera to be displayed as the camera information.

12. The non-transitory computer-readable storage medium according to claim 9, wherein said display control step causes map information indicating a position of the control-target camera and a position of the one or more cameras positioned at a direction corresponding to the operation request exceeding the viewable angle of the control-target camera to be displayed as the camera information.

13. The apparatus according to claim 1, wherein the display control unit causes the camera information to be displayed at a display area where a part of a video display area for displaying a video from the control-target camera before the operation request exceeds the viewable angle of the control-target camera.

14. The method according to claim 5, wherein the display control step causes the camera information to be displayed at a display area where a part of a video display area for displaying a video from the control-target camera before the operation request exceeds the viewable angle of the control-target camera.

15. The non-transitory computer-readable storage medium according to claim 9, wherein the display control step causes the camera information to be displayed at a display area where a part of a video display area for displaying a video from the control-target camera before the operation request exceeds the viewable angle of the control-target camera.

* * * * *